United States Patent [19]
McLaury

[11] Patent Number: 5,202,587
[45] Date of Patent: Apr. 13, 1993

[54] MOSFET GATE SUBSTRATE BIAS SENSOR

[75] Inventor: Loren L. McLaury, Boise, Id.

[73] Assignee: Micron Technology, Inc., Boise, Id.

[21] Appl. No.: 633,716

[22] Filed: Dec. 20, 1990

[51] Int. Cl.⁵ .......................... H03K 3/01; H03K 5/13
[52] U.S. Cl. .................................. 307/296.2; 307/578;
307/607; 307/264; 307/350
[58] Field of Search ...................... 307/296.2, 578, 607,
307/264, 350

[56] References Cited
U.S. PATENT DOCUMENTS 4,581,546  4/1986  Allan ..................................... 307/297
5,045,716  9/1991  Takacs et al. ...................... 307/296.2

OTHER PUBLICATIONS

IBM Tech. Disc. Bul. vol. 28 No. 3 Aug. 1985 "Voltage Regulator Circuit for CMOS Substrate Voltage Generator".

Primary Examiner—William L. Sikes
Assistant Examiner—Margaret Rose Wambach
Attorney, Agent, or Firm—Susan B. Collier

[57] ABSTRACT

A low current substrate bias generator for regulating the potential of a substrate layer of an integrated circuit includes a sense element having an input for sensing the potential of the substrate. The substrate bias gates a PMOS transistor connected in a source follower configuration, being serially connected to a load element at its output and connected to ground at its drain. The PMOS transistor output is a control signal. The control signal is complemented by an inverter and the complement activates a charge pump that is coupled to the substrate layer or well that is desired to be regulated. The sense element includes the PMOS transistor and the load element. The sense element does not deplete or enhance the substrate potential but only provides substrate bias sensing and a subsequent control signal for activation and deactivation of the charge pump.

22 Claims, 5 Drawing Sheets

MOSFET GATE SUBSTRATE BIAS SENSOR

FIELD OF THE INVENTION

This invention relates generally to bias generator circuits for generating a desired potential for a semiconductor substrate layer of an integrated circuit, and more particularly to a circuit and method for reducing the amount of current required by the bias generator.

BACKGROUND OF THE INVENTION

A technique for improving the performance of an integrated circuit formed on a substrate, such as a memory device, is to provide a separate bias potential to the substrate instead of coupling the substrate to a predetermined potential, usually the five volt power supply or a ground reference potential, as appropriate. The supply potential may be either a positive 5 volts or a negative 5 volts. The value of the bias potential may be more negative than either the ground reference potential or the negative 5 volts or more positive than the positive 5 volts, for either P-type or N-type substrate layers or wells.

The substrate bias potential is typically generated with an on-chip circuit containing a charge pump. When the substrate layer or well potential changes from a correct value due to leakage or a change in the operating condition of the integrated circuit, a sense element detects the change and provides an output signal to activate a charge pump. In turn, the charge pump pumps charge into or out of the substrate layer until the substrate layer or well potential returns to the correct value. The sense element then provides an output signal to deactivate the charge pump.

The bias generator includes a sense element having an input for sensing the potential of the substrate and an output that is coupled to an inverter. The inverter provides a control signal directly or indirectly to the charge pump. Normally a hysteresis circuit couples the control signal to the charge pump input. The charge pump activates and provides an output to the substrate layer or well that is desired to be regulated. The hysteresis circuit eliminates erratic switching.

Bias generator circuits draw a significant current that flows directly into or out of the substrate through the sense element. This current directly and indirectly increases the power requirements of the bias generator circuit; directly because of the power consumption due to the current flowing through circuit components and indirectly due to the added current requirements to compensate for the current flowing into or out of the substrate through the sense element. Normally, in the case of a negatively charged P-type substrate layer or well, the sense element current further raises the substrate potential. Therefore, the charge pump must be activated more frequently to maintain a nominal substrate potential. Conversely, in the case of a positively charged N-type substrate or well, the additional current depletes the substrate potential causing the charge pump to activate more frequently to maintain the higher potential.

A sense element 5 is shown in detail in the bias generator circuit 6 depicted in FIG. 1. The sense element 5 is a MOS, metal oxide semiconductor, diode series 10 connected directly to the substrate layer at a bias node 15 of the substrate layer. The MOS diode series 10 is connected to $V_{CC}$ 16 through a load element 20. The MOS diode series 10 and the load element 20 are connected at an intermediate node 25. The diode series 10 and the load element 20 are known as a level shifting circuit since the potential at the intermediate node 25 is dependent on the potential drop across the diodes series 10. As the bias node potential $V_{BB}$ increases, the intermediate node potential increases. Eventually, the intermediate node potential will be high enough to gate an inverter 30. The inverter 30 comprises an input switching N-type MOS, NMOS, field effect transistor, FET, 35 serially connected to a P-type MOS, PMOS, load FET 40 at the inverter output 45. Thus, a shift in the potential at the intermediate node from a low level to a high level causes the inverter to activate a charge pump 50 through the hysteresis circuit 55. Current flows continually in the sense element 5 to further increase the charge in the substrate layer; charge and current considered as positive values throughout this discussion. Consequently, the charge pump 50 is activated frequently in order to recharge the substrate layer to the correct level.

FIG. 2 is a timing diagram relating the bias node potential, $V_{BB}$ 60, to the charge pump input potential, $ENV_{BB}$ 65. The sense element provides an output signal, $V_1$ 70, at the intermediate node to the inverter input. The inverter output provides a control signal, $V_2$ 75. The control signal, $V_2$ 75, activates the charge pump through the hysteresis circuit. By analyzing $ENV_{BB}$ 65 it can be seen that the charge pump is activated every 2.8 microseconds when $ENV_{BB}$ goes high.

Since the charge pump is typically 25-35% efficient, an additional 1 microamp ($\mu A$) of current flowing in the sense element translates to an additional 3-4 $\mu A$ of current that must be consumed by the charge pump. Typically, 5 $\mu A$ of current is required by the sense element to maintain a reasonably short delay time to respond to changes in the substrate potential. Thus, a total of 20-25 $\mu A$ of additional current is consumed by the bias generator circuit.

One simple way to reduce the current requirements of the bias generator circuit is to decrease the current flowing through the sense element by increasing the value of the load element. Such a decrease in current, however, produces a corresponding undesirable increase in the delay time in response to changes in the substrate potential. Thus, the accuracy of the regulated substrate potential decreases resulting in decreased performance and, possibly, latch-up of the integrated circuit.

What is desired is a bias generator circuit for regulating the potential of a substrate on an integrated circuit having a low current requirement yet maintaining a reasonable delay time in responding to changes in the substrate potential.

SUMMARY OF THE INVENTION

In the present embodiment the sense element comprises a coupling device connected to the bias node from a minimal current draw terminal. The minimal current draw terminal is characterized by a high input impedance ideally reducing current flow to zero. It is often used as a control terminal for the coupling device. The coupling device may be a PMOS FET, connected in a source follower configuration to sense a P-type substrate potential. In this case the gate terminal is the minimal current draw terminal. However, other configurations may be used, for example a NMOS FET connected in a source follower configuration to an n-type substrate.

In the source follower configuration the input is applied to the gate terminal and the output is at the source terminal. The drain terminal is connected to ground. The sense element comprising a PMOS transistor connected in a source follower configuration will be referred to as a P-channel source follower sense element. A P-channel source follower sense element reduces the direct current flow into the substrate to zero. The P-channel source follower sense element of the present embodiment consists of the PMOS transistor having its gate connected directly to the substrate layer.

The PMOS transistor and a load element are serially connected at the source terminal, the point of connection being called the intermediate node. The PMOS transistor is connected at its drain to ground and the load element is connected to $V_{CC}$. The gate potential controls the resistance of the PMOS transistor such that as the substrate potential increases, the resistance from the source to the drain increases, thus increasing the potential across the PMOS transistor, which is the potential from the intermediate node to ground. The potential at the intermediate node is that of an output signal of the sense element and is the input to an inverter.

When the output signal potential at the intermediate node increases, it eventually reaches a level that looks high to the inverter. When the inverter input is high it follows that its output is low. The low inverter output is a control signal that activates the charge pump. Since no current flows from the gate to the substrate there is no further depletion of the substrate potential by the sense element. Thus, changes in the substrate potential are indirectly coupled from the input to the output of the P-channel source follower sense element, activating the charge pump without a current flow into the substrate.

Regulation of the substrate potential proceeds with no corresponding increase in delay time. The charge pump is activated less frequently since the sense element is not increasing the substrate charge level. As can be seen from the timing diagram of FIG. 4, a decreased frequency of charge pump activation is a direct result of using the substrate potential sensing of the P-channel source follower sense element. This results in reduced power consumption over the more frequent charge pump activation in the traditional MOS diode series sense element depicted in FIG. 2.

DETAILED DESCRIPTION OF THE PREFERRED EMBODIMENT

Figure 3:
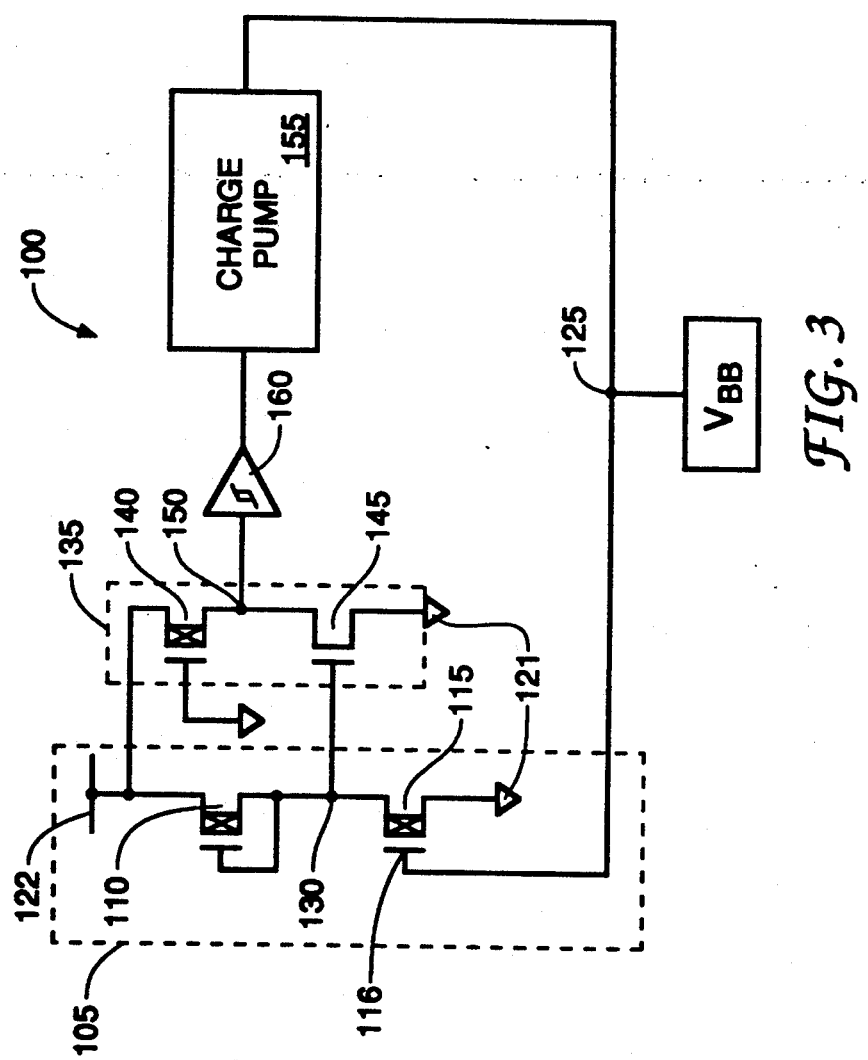
FIG. 3 depicts a bias generator of the preferred embodiment with a detailed sense element and inverter for charge pump activation.

FIG. 3 depicts the bias generator 100 of the present embodiment. A P-channel source follower sense element 105 comprising a PMOS diode load element 110 serially connected to a PMOS field effect transistor 115 is sensitive to changes in the substrate potential through the gate connection 116 of the PMOS transistor 115 to the bias node 125 of the substrate layer. The PMOS transistor 115 is connected in a source follower configuration by connecting its drain to ground. The PMOS diode load element 110 is a PMOS FET connected as a diode having its source terminal connected to supply potential, $V_{CC}$ 122, and its drain terminal connected to its gate and serially connected to the source of the PMOS transistor 115. The serial connection of the PMOS diode 110 and the PMOS transistor 115 is an intermediate node 130. Optionally, the load element may be a resistor or a transistor.

The potential at the intermediate node is the output signal, $V_1$, and provides the input potential to an inverter 135. The inverter 135 comprises a continually gated PMOS load FET 140 connected to $V_{CC}$ 122 and serially connected to an NMOS switching FET 145. The NMOS switching FET 145 is gated by the output signal of the intermediate node 130 and is connected to ground at its source. The serial connection of the NMOS switching FET 145 and the continually gated PMOS load FET 140 is the inverter output 150. It follows that the inverter output 150 is the complement of the intermediate node potential 130.

In this case the bias generator 100 charges the substrate layer to a negative potential. Because of leakage, the substrate potential $V_{BB}$ will increase. The sense element 105 detects changes in the substrate potential. As the substrate potential increases, the gate potential of the PMOS transistor 115 increases, increasing the resistance of the PMOS transistor 115 from the intermediate node 130 to ground 121. Since the resistance increases the output signal, $V_1$, at the intermediate node 130 increases. At a certain point the inverter circuit 135 detects the output signal as a high, its output 150 switches low, providing a control signal to activate the charge pump 155 through the hysteresis circuit 160. The charge pump 155 and hysteresis circuit 160 can take the form of numerous conventional devices performing the same function. Such devices are well known to those skilled in the art. The size ratio of the PMOS diode 110 to the PMOS transistor 115 is such that the inverter input goes high at a predetermined substrate potential. The charge pump 155 then removes charge from the substrate resulting in a more negative substrate potential, thus causing a corresponding decrease in the gate potential of the PMOS transistor 115. As the gate potential decreases the resistance of the PMOS transistor decreases and the potential from the intermediate node 130 to ground 121 decreases. The inverter 135 eventually detects a low and its output 150 switches high providing a control signal to deactivate the charge pump 155 through the hysteresis circuit 160. The cycle is then repeated.

Figure 1:
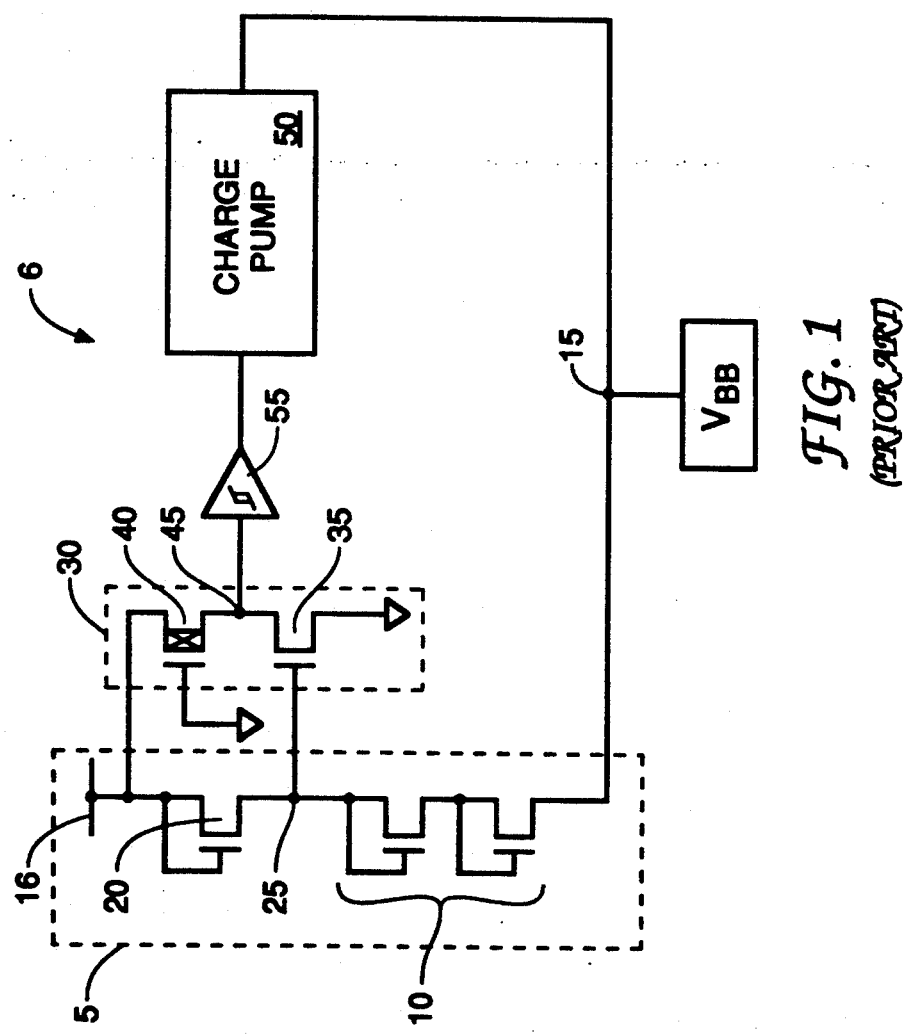
FIG. 1 depicts a prior art bias generator having a detailed sense element and inverter for charge pump activation.
Figure 2:
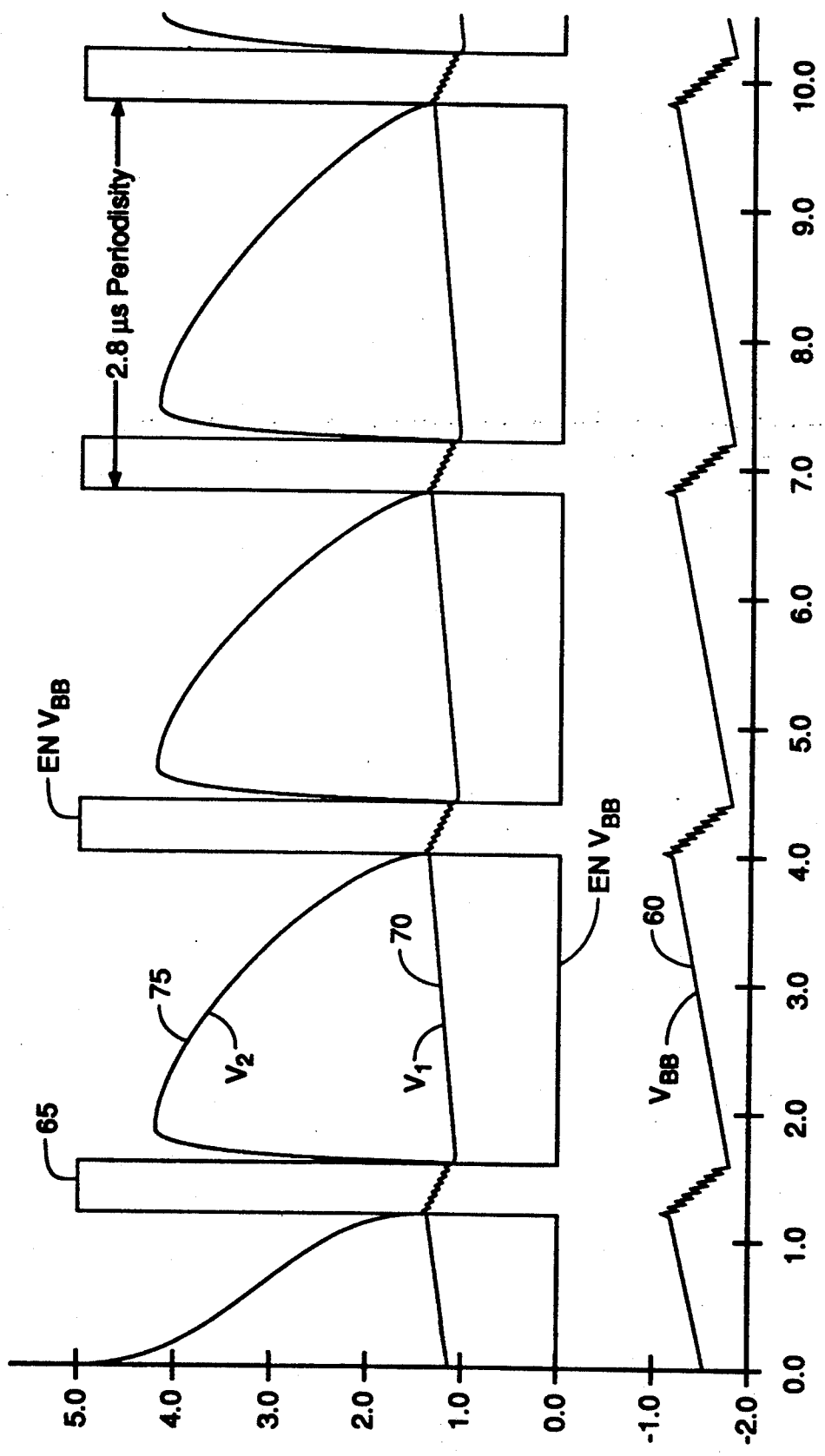
FIG. 2 is a timing diagram relating the pertinent potentials of the prior art bias generator.
Figure 4:
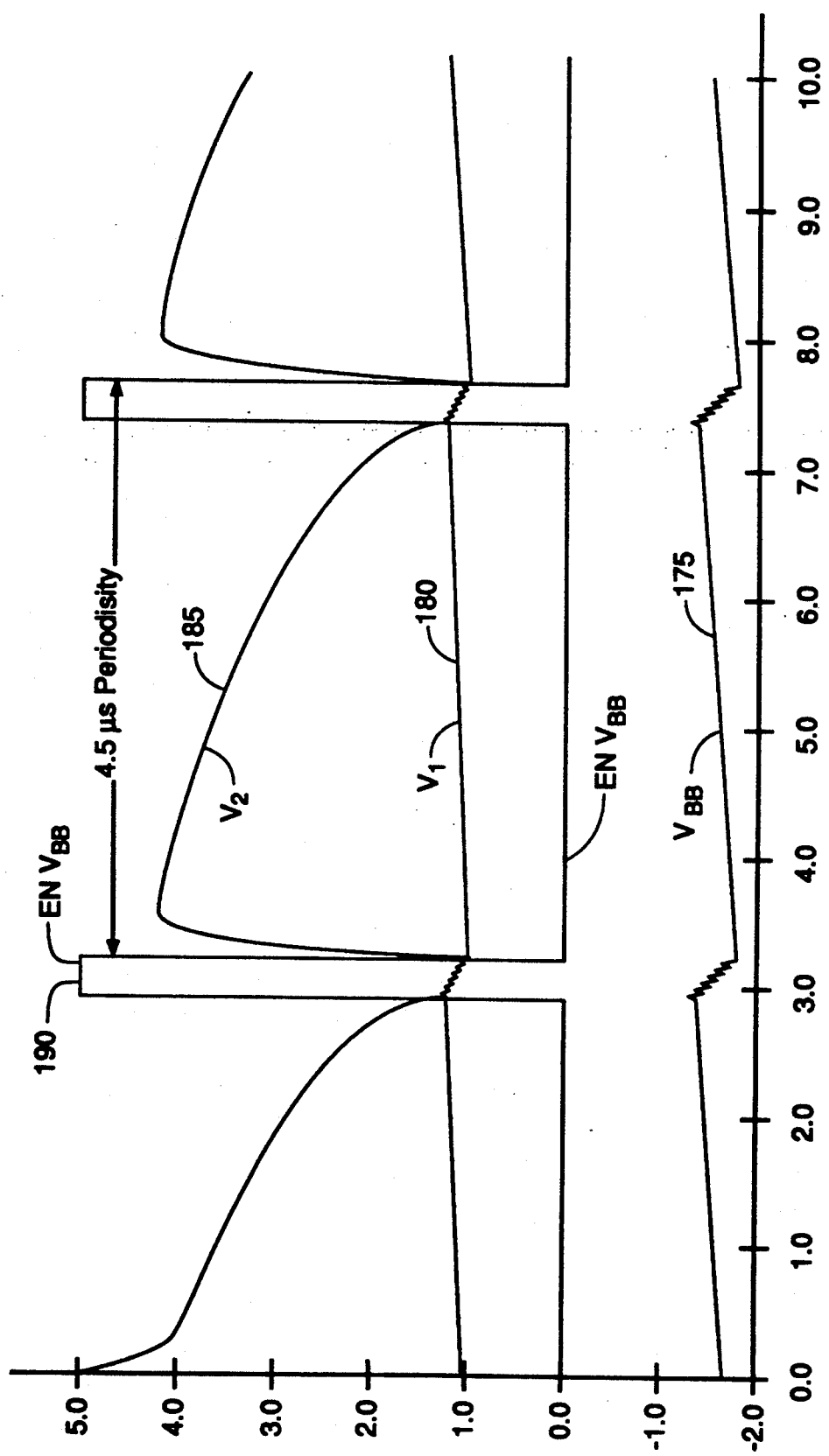
FIG. 4 is a timing diagram relating the pertinent potentials of the bias generator of the preferred embodiment.

The bias generator circuit of FIG. 3 is better understood by studying the circuit potentials depicted in timing diagram format in FIG. 4. The substrate bias potential, $V_{BB}$, at the bias node is shown at line 175; the output signal potential, $V_1$, at the intermediate node is shown at line 180; the control signal potential, $V_2$, at the inverter output is shown at line 185; and the charge pump input potential, $ENV_{BB}$, is shown at line 190. The substrate bias potential, $V_{BB}$, increases at a slower rate in the bias generator having a P-channel source follower sense element than the $V_{BB}$ in the bias generator having a MOS diode series sense element. This rate difference can be seen by comparing FIGS. 2 and 4, since the time scale of the X axis is the same in both figures. This decreased rate of change of $V_{BB}$ is a significant improvement and is a direct result of the P-channel source follower sense element.

Further study of FIG. 4 reveals that $V_{BB}$ and $V_1$ increase at the same rate. When $V_1$ increases to approximately 1.2 volts, the potential looks like a high to the inverter circuit 135 and the control signal, V2, at the inverter output 150 switches low. The low control signal causes the hysteresis circuit output to go high. The hysteresis output and the charge pump input, $ENV_{BB}$, are the same signal. The charge pump 155 is activated by the high $ENV_{BB}$. The activated charge pump 155 causes $V_{BB}$ to decrease, with a corresponding decrease in $V_1$ to approximately 1.05 volts. The inverter 135 perceives this decrease as a low and therefore the control signal at the inverter output switches high, causing $ENV_{BB}$ to go low, deactivating the charge pump 155. Since no current flows through the gate 120 at any time during the cycle, the substrate charge is not increased by the P-channel source follower sense element. Since there is no substrate charge increase due to the P-channel source follower sense element, the charge pump 155 is not activated as often. The periodicity increases from 2.8 micro seconds for the PMOS diode series sense element to 4.5 micro seconds for the P-channel source follower sense element of the present embodiment, a 160% increase.

A similar circuit can be designed for an N-type substrate layer using an N-channel source follower sense element having an NMOS transistor serially connected to an NMOS diode load element, or using an NPN bipolar transistor serially connected to a load element.

Figure 5:
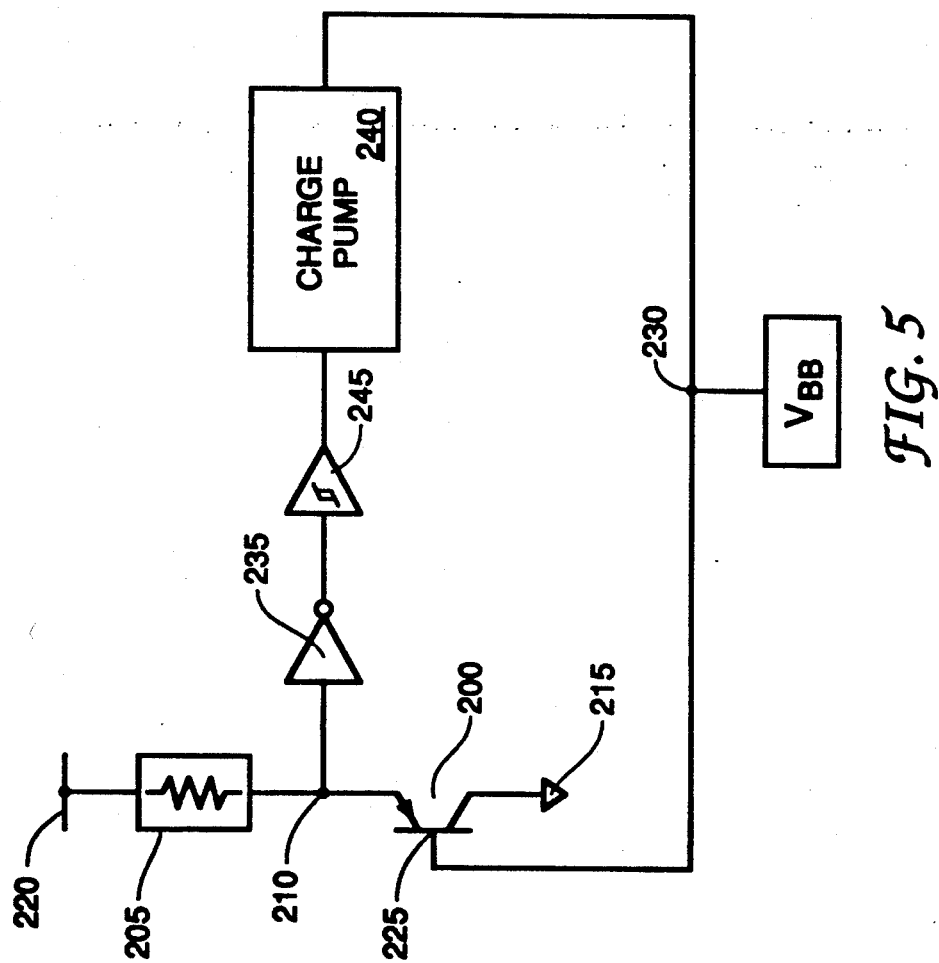
FIG. 5 depicts a sense element comprising a bipolar transistor.

FIG. 5 depicts an alternate bipolar configuration. In this case a PNP transistor 200 is connected in an emitter follower configuration; wherein the emitter is connected to a load element 205 at an intermediate node 210 and the collector is connected to ground 215, the load being connected to the supply potential $V_{EE}$ 220. In this case the base 225 is the minimal current draw terminal. The base 225 is connected to the bias node 230 in order to detect changes in the substrate potential. An output signal at the intermediate node 210 drives an inverter 235. The inverter output is a control signal for activating the charge pump 240 through the hysteresis circuit 245.

While the preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. A low current substrate bias generator for regulating the magnitude of a desired potential of a substrate layer in an integrated circuit, comprising:
    a) a bias node coupled to the substrate layer;
    b) an intermediate node for providing an output signal;
    c) a sense element coupled between a reference node and said intermediate node, said sense element electrically connected to said bias node at a minimal current draw control input, and providing said output signal in response to the potential of the substrate layer at the bias node;
    d) an inverter having an inverter input and an inverter output, said inverter input being coupled to the intermediate node, said inverter input receiving said output signal from said intermediate node, and said inverter output providing a control signal; and
    e) a charge pump capable of affecting the potential of the substrate layer and having a charge pump input coupled to the inverter output and a charge pump output coupled to said bias node, said charge pump input receiving said control signal, said control signal capable of activating and deactivating said charge pump, thereby providing the desired potential to the substrate layer.

2. The low current substrate bias generator as in claim 1, wherein said minimal current draw control input is characterized by a high input impedance ideally reducing current flow to zero.

3. The low current substrate bias generator as in claim 1, wherein the integrated circuit substrate layer is a P-channel metal oxide semiconductor.

4. The low current substrate bias generator as in claim 1, wherein the integrated circuit substrate layer is an N-channel metal oxide semiconductor.

5. The low current substrate bias generator as in claim 1, wherein said low current substrate bias generator, wherein said sense element further comprises:
    a) a load element being connected to a supply node; and
    b) a transistor serially connected from a first transistor terminal to said load element at said intermediate node, said transistor being connected to said reference node at a second transistor terminal.

6. The low current bias substrate generator of claim 5, wherein:
    said transistor is a metal oxide semiconductor field-effect transistor, said minimal current draw terminal being a gate terminal, said first transistor terminal being a source terminal, and said second transistor terminal being a drain terminal.

7. The low current bias substrate generator of claim 6, wherein said transistor is a P-channel metal oxide semiconductor.

8. The low current bias substrate generator of claim 6, wherein said transistor is an N-channel metal oxide semiconductor.

9. The low current bias substrate generator of claim 5, wherein:
    said transistor is a bipolar transistor, said minimal current draw terminal being a base terminal, said first transistor terminal being an emitter terminal, and said second transistor terminal 10. The low current bias substrate generator of claim 9, wherein said transistor is a P-type transistor.

11. The low current bias substrate generator of claim 9, wherein said transistor is an N-type transistor.

12. The low current substrate bias generator as in claim 1, further comprising a hysteresis circuit element interposed between the inverter output and the charge pump input.

13. The low current substrate bias generator as in claim 1, wherein the inverter comprises an input switching field-effect transistor serially connected to a load field-effect transistor at an inverter output, the size of the input switching field-effect transistor being at least ten times the size of the load field-effect transistor.

14. A circuit for sensing and regulating a substrate potential of a substrate to a desired value, the circuit comprising:
   a) a charge pump in electrical communication with the substrate at a charge pump output node, said charge pump capable of charging the substrate to the substrate potential; and
   b) a sense device having a minimal current draw control input in electrical communication with the substrate and in electrical communication with the charge pump output node, said sense device having a sense output node, a value of a potential at said sense output node controlled in response to the substrate potential at the minimal current draw control input, said charge pump actuated in response to the potential at the sense output node, said charge pump actuated when the substrate potential deviates from the desired value and deacuated when the substrate potential has the desired value.

15. The circuit as specified in claim 14, wherein said minimal current draw control input is characterized by a high input impedance ideally reducing current flow to zero.

16. The circuit as specified in claim 14, further comprising a load element in series with said sense device.

17. The circuit as specified in claim 14, further comprising an inverter circuit for inverting the potential at said sense output node to said charge pump.

18. The circuit as specified in claim 14, further comprising a hysteresis circuit electrically interposed between said sense output node and said charge pump, said hysteresis circuit reducing noise and false triggering of said charge pump.

19. A method for providing a substrate potential having a desired value on a substrate, comprising the following steps:
   a) applying the substrate potential to a minimal current draw control input of a sensing device;
   b) regulating a current of the sensing device in response to the substrate potential at the minimal current draw control input, said minimal current draw control input characterized as having a high input impedance ideally reducing current flow to zero;
   c) providing a sense potential, having at least a first and a second state, at a sense output node of said sensing device in response to said step of regulating;
   d) pumping the substrate to the desired value in response to said first state of said sense potential; and
   e) terminating said step of pumping in response to said second state of said sense potential.

20. The method as specified in claim 19, wherein said step of generating further comprises inverting said sense potential to provide a signal to a charge pump, said charge pump capable of performing said pumping.

21. The method as specified in claim 19, further comprising reducing false pumping of said substrate.

22. The method as specified in claim 19, wherein said step of regulating the current further comprises confining said current to the sensing device, a value of the substrate potential unaffected by said current.

* * * * *